US010989214B2

(12) United States Patent
Henseler et al.

(10) Patent No.: US 10,989,214 B2
(45) Date of Patent: Apr. 27, 2021

(54) ACTIVE MAGNETIC ROTOR-BEARING ASSEMBLY HAVING AN EVEN NUMBER OF ELECTROMAGNETIC UNITS WITH A SALIENT CONNECTED TO INTER-YOKE PORTIONS SEPARATED FROM EACH OTHER BY A PERMANENT MAGNET STRUCTURE SPACER OF DEFINED MAGNETIC PERMEABILITY

(71) Applicant: ReinHeart GmbH, Gütersloh (DE)

(72) Inventors: Andreas Henseler, Simmerath (DE); Hongyu Deng, Aachen (DE)

(73) Assignee: REINHEART GmbH

( * ) Notice: Subject to any disclaimer, the term of this patent is extended or adjusted under 35 U.S.C. 154(b) by 347 days.

(21) Appl. No.: 15/754,666

(22) PCT Filed: Aug. 21, 2016

(86) PCT No.: PCT/EP2016/069756
§ 371 (c)(1),
(2) Date: Feb. 23, 2018

(87) PCT Pub. No.: WO2017/032725
PCT Pub. Date: Mar. 2, 2017

(65) Prior Publication Data
US 2018/0252228 A1 Sep. 6, 2018

(30) Foreign Application Priority Data
Aug. 25, 2015 (EP) .................................... 15182300

(51) Int. Cl.
*F04D 29/048* (2006.01)
*F16C 32/04* (2006.01)
*H02K 7/09* (2006.01)

(52) U.S. Cl.
CPC ........ *F04D 29/048* (2013.01); *F16C 32/0465* (2013.01); *F16C 32/0468* (2013.01);
(Continued)

(58) Field of Classification Search
CPC ... H02K 7/09; F04D 29/048; F05B 2240/511; F05B 2240/515; F16C 32/0465; F16C 32/0468; F16C 32/0485
(Continued)

(56) References Cited

U.S. PATENT DOCUMENTS 3,127,094 A * 3/1964 Smith .................. F04D 29/281
416/184
5,112,202 A * 5/1992 Oshima ................ F04D 29/048
417/423.7

(Continued)

FOREIGN PATENT DOCUMENTS

| CN | 102032270 A | 4/2011 |
| JP | 2011085223 A | 2/2011 |

OTHER PUBLICATIONS

International Preliminary Report on Patentability corresponding PCT/EP2016/069756 dated Feb. 27, 2018.
(Continued)

*Primary Examiner* — Patrick Hamo
*Assistant Examiner* — Benjamin Doyle
(74) *Attorney, Agent, or Firm* — Tarolli, Sundheim, Covell & Tummino LLP

(57) ABSTRACT

An active magnetic rotor-bearing assembly for conveying a fluid comprising a rotor assembly is disclosed and a bearing assembly for contactless bearing the rotor assembly, where the bearing assembly comprises an even number of electromagnetic units arranged around a central structure each comprising a first salient established by a magnetic material and a permanent magnet providing a first magnetic pole and
(Continued)

a coil around the salient, further comprises an inter-yoke with inter-yoke portions connected to the first salient of each electromagnetic unit and being separated from each other by structure spacers, providing a closed first magnetic flux passing the rotor assembly applying a first attractive force further comprising a position stabilizing portion perpendicular to the first attractive force on the rotor-assembly and the coils providing an electromagnetic flux between each first salient and the rotor assembly for applying adaptable axial force and/or tilting torque to the rotor assembly.

15 Claims, 6 Drawing Sheets

(52) U.S. Cl.
CPC ........... *F16C 32/0485* (2013.01); *H02K 7/09* (2013.01); *F05B 2240/511* (2013.01); *F05B 2240/515* (2013.01)

(58) Field of Classification Search
USPC ..................................... 417/423.12; 310/90.5
See application file for complete search history.

(56) References Cited

U.S. PATENT DOCUMENTS

| | | | | |
|---|---|---|---|---|
| 5,725,357 | A * | 3/1998 | Nakazeki | F04D 15/0066 415/173.5 |
| 5,818,131 | A * | 10/1998 | Zhang | F04D 29/049 310/15 |
| 5,840,070 | A * | 11/1998 | Wampler | H02K 41/03 604/131 |
| 5,947,703 | A * | 9/1999 | Nojiri | F04D 29/048 415/229 |
| 6,053,705 | A | 4/2000 | Schob et al. | |
| 6,071,093 | A * | 6/2000 | Hart | A61M 1/1029 417/424.2 |
| 6,234,772 | B1 * | 5/2001 | Wampler | F04D 29/047 417/423.12 |
| 6,244,835 | B1 * | 6/2001 | Antaki | F04D 3/005 415/900 |
| 6,302,661 | B1 * | 10/2001 | Khanwilkar | F04D 13/0646 415/900 |
| 6,320,290 | B1 * | 11/2001 | Kanebako | F16C 32/0468 310/90.5 |
| 6,547,530 | B2 * | 4/2003 | Ozaki | F02K 7/06 415/900 |
| 6,641,378 | B2 * | 11/2003 | Davis | F04D 13/0666 310/90.5 |
| 7,128,538 | B2 * | 10/2006 | Tsubouchi | F04D 15/0066 417/12 |
| 8,283,829 | B2 * | 10/2012 | Yamamoto | H02K 1/2793 310/156.32 |
| 8,540,477 | B2 * | 9/2013 | LaRose | A61M 1/1029 415/106 |
| 9,227,001 | B2 * | 1/2016 | Akkerman | A61M 1/122 |
| 9,382,908 | B2 * | 7/2016 | Ozaki | F04D 7/04 |
| 9,662,431 | B2 * | 5/2017 | Franano | A61M 1/3653 |
| 9,709,061 | B2 * | 7/2017 | Yanai | F04B 35/04 |
| 10,245,361 | B2 * | 4/2019 | Yanai | F04D 13/064 |
| 10,371,152 | B2 * | 8/2019 | Yanai | A61M 1/1015 |
| 2001/0016170 | A1 * | 8/2001 | Ozaki | F04D 13/0666 417/420 |
| 2002/0094281 | A1 * | 7/2002 | Khanwilkar | F04D 13/0666 417/356 |
| 2002/0105241 | A1 * | 8/2002 | Carroll | F16C 32/0497 310/90.5 |
| 2004/0143151 | A1 * | 7/2004 | Mori | A61M 1/101 600/16 |
| 2005/0006971 | A1 | 1/2005 | Lindberg et al. | |
| 2005/0025630 | A1 * | 2/2005 | Ayre | A61M 1/101 417/53 |
| 2005/0089422 | A1 * | 4/2005 | Ozaki | F04D 13/0666 417/423.12 |
| 2005/0147512 | A1 * | 7/2005 | Chen | A61M 1/1015 417/423.12 |
| 2005/0287022 | A1 * | 12/2005 | Yaegashi | A61M 1/101 417/420 |
| 2007/0231135 | A1 * | 10/2007 | Wampler | F04D 29/0476 415/229 |
| 2007/0297923 | A1 * | 12/2007 | Tada | A61M 1/1017 417/356 |
| 2008/0124231 | A1 * | 5/2008 | Yaegashi | F04D 13/0666 417/417 |
| 2008/0240947 | A1 * | 10/2008 | Allaire | A61M 1/1015 417/420 |
| 2008/0246373 | A1 | 10/2008 | Filatov | |
| 2009/0079284 | A1 * | 3/2009 | Onuma | F16C 32/048 310/90.5 |
| 2009/0121571 | A1 * | 5/2009 | Onuma | F04D 29/058 310/90.5 |
| 2009/0234447 | A1 * | 9/2009 | LaRose | A61M 1/101 623/3.13 |
| 2010/0172775 | A1 * | 7/2010 | Onuma | F16C 32/048 417/423.7 |
| 2011/0129373 | A1 * | 6/2011 | Mori | F04D 29/048 417/420 |
| 2011/0238172 | A1 * | 9/2011 | Akdis | F04D 13/0666 623/3.11 |
| 2011/0318203 | A1 * | 12/2011 | Ozaki | F04D 29/048 417/420 |
| 2012/0035411 | A1 * | 2/2012 | LaRose | F04D 13/0633 600/16 |
| 2012/0095280 | A1 * | 4/2012 | Timms | F04D 29/048 600/16 |
| 2012/0169167 | A1 * | 7/2012 | Fan | F16C 32/0478 310/90.5 |
| 2013/0243623 | A1 * | 9/2013 | Okawa | F04D 13/06 417/410.1 |
| 2015/0061652 | A1 * | 3/2015 | Otobe | G01R 33/02 324/207.17 |
| 2015/0362015 | A1 * | 12/2015 | Schulz | F16C 32/0461 310/90.5 |
| 2016/0235899 | A1 * | 8/2016 | Yu | A61M 1/1015 |

OTHER PUBLICATIONS

International Search Report for corresponding International application No. PCT/EP2016/069756 dated Nov. 2, 2016.

* cited by examiner

US 10,989,214 B2

ACTIVE MAGNETIC ROTOR-BEARING ASSEMBLY HAVING AN EVEN NUMBER OF ELECTROMAGNETIC UNITS WITH A SALIENT CONNECTED TO INTER-YOKE PORTIONS SEPARATED FROM EACH OTHER BY A PERMANENT MAGNET STRUCTURE SPACER OF DEFINED MAGNETIC PERMEABILITY

RELATED APPLICATIONS

The present invention is a U.S. National Stage under 35 USC 371 patent application, claiming priority to Serial No. PCT/EP2016/069756, filed on 21 Aug. 2016; which claims priority of EP 15182300.2, filed on 25 Aug. 2015, the entirety of both of which are incorporated herein by reference.

FIELD OF THE INVENTION

The present invention relates to an active magnetic rotor-bearing assembly for conveying a fluid, to a fluid pump comprising such assembly and to a method to operate such an assembly.

BACKGROUND OF THE INVENTION

Magnetic bearings use magnetic levitation to support moving parts without physical contact. For instance, they are able to levitate a rotating body and permit relative motion with very low friction and no mechanical wear. An active magnetic bearing works on the principle of electromagnetic suspension and consists of an electromagnet assembly, a set of power amplifiers which supply current to the electromagnets, a controller to control the electromagnetic assembly and gap sensors with associated electronics to provide the feedback required to control the position of the rotor within the gap. Magnetic bearings might be established as passive magnetic bearings or active magnetic bearings to levitate and control the rotating body. For this purpose passive magnetic bearings exclusively utilize permanent magnets, while active magnetic bearings utilize electromagnets to actively adapt magnetic forces using electromagnets exclusively or in combination with additional permanent magnets. Passive magnetic bearings are cheaper bearings, since there are no control electronics required. However the rotor movement cannot be adapted during operation resulting in a less controlled rotor movement. Active magnetic bearings allow controlling the rotor movements much more accurate, but the therefore needed control electronics require a more complex arrangement of components and subsequently cause higher costs. The additional components to enable an active magnetic bearing result in a less compact product. Especially the radial stabilization of the rotor makes active magnetic bearings more complicated, corresponding fluid pumps less compact and increase the required power consumption for operating the active magnetic bearing of a rotor within a fluid pump. It would be desirable to obtain an active magnetic bearing concept enabling a rotor to rotate more stable, while the bearing layout is less complex enabling a more compact product size and less power consumption during operation.

SUMMARY OF THE INVENTION

It is the object of the present invention to provide a bearing concept with improved bearing properties, while the bearing layout is less complex enabling a more compact product size, has a less power consumption during operation and has a less impact on the pumped fluid.

This object is solved by an active magnetic rotor-bearing assembly for conveying a fluid comprising a rotor assembly driven by a motor assembly and a bearing assembly for contactless bearing the rotor assembly, wherein the bearing assembly comprises an even number of electromagnetic units, preferably at least four electromagnetic units, arranged around a central structure of the bearing assembly each comprising a first salient established by a magnetic material and a permanent magnet at least magnetically connected to the magnetic material providing a first magnetic pole facing towards the rotor assembly and a coil wound around the first salient, where the bearing assembly further comprises an inter-yoke comprising inter-yoke portions connected to the first salient of each electromagnetic unit, where the permanent magnets of adjacent electromagnetic units are suitably arranged to provide a closed first magnetic flux via the first salient and the inter-yoke portions of the both adjacent electromagnetic units and the rotor assembly applying a first attractive force further comprising a position stabilizing portion perpendicular to the first attractive force on the rotor-assembly, and the coils providing an electromagnetic flux between each first salient and the rotor assembly for applying adaptable axial force and/or tilting torque to the rotor assembly in order to adjust the bearing provided by the first magnetic flux.

The active magnetic bearing enables to reliably bear the rotor assembly at larger gaps between the rotor assembly and the bearing assembly and between the rotor assembly and the housing around the rotor-bearing assembly resulting in a lesser impact on the pumped fluid, which is especially important in the case of blood as the fluid.

The term "bearing" denotes the compensation of at least present motor and fluid-caused forces at least at a levitation position of the rotor assembly within the rotor-bearing assembly. The first attractive force acting on the rotor-assembly is for compensating at least present motor and fluid-caused forces at the levitation position of the rotor assembly of the rotor-bearing assembly. The levitation position of the rotor assembly denotes the position, where the physical situation is present, where at least the sum of the average motor force and the average fluid caused force acting on the rotor assembly is compensated by at least the contrariwise acting permanent attractive forces provided by the bearing assembly. Preferably the levitation position is provided without generating additional electromagnetic forces by operating the coils of the electromagnetic units. The contrariwise acting permanent attractive forces at the levitation position are constant forces provided by permanent magnets like the first magnetic force and eventually additional second or third magnetic forces. The levitation range denotes the range within the levitation position of the rotor assembly is allowed to vary depending on the forces acting onto the rotor assembly. Within the levitation range, it is possible to obtain a certain levitation position, where the forces acting contrariwise on the rotor assembly compensate each other without applying additional electromagnetic forces. Due to the occurring force variations, the active magnetic bearing has eventually to additionally apply an adaptable axial force and/or tilting torque to the rotor to keep the rotor within the levitation range during rotation and to compensate the current motor force and fluid caused force eventually fluctuating and eventually additional forces like gravity etc. at least in case of the levitation position of the rotor assembly approaches the limits of the levitation range to prevent the rotor assembly leaving the levitation range in order to prevent the rotor from touching surrounding parts. This adaptable axial force and/or tilting torque are provided by the electromagnetic flux generated by the coils of the electromagnetic units.

The term "rotor assembly" denotes all parts, which are rotated for conveying the fluid and its rotation is controlled by the motor assembly and the bearing assembly. The term "motor assembly" denotes all parts required to apply a motor force (or drive force) to the rotor assembly. The motor force is typically applied via an electromagnetic flux provided by electromagnets as part of the motor assembly, which are controlled by a drive controller, interacting with permanent magnets suitable arranged within the rotor assembly close to the motor assembly. The term "bearing assembly" denotes a unit comprising all components required to apply magnetic and electromagnetic forces to the rotor assembly in order to levitate and control stable rotation of the rotor. The bearing assembly comprises a side with a suitably adapted shape facing towards the rotor assembly. In an embodiment, this side is a flat planar side without protrusions or cavities in case of a planar side of the rotor assembly facing towards the bearing assembly.

The term "contactless" denoted a rotation of the rotor assembly without being in direct contact to any housing of the rotor. However, in order to be able to convey a fluid, the rotor assembly is in close contact to the fluid to be conveyed. The term "fluid" denotes a substance that continually deforms (flows) under an applied shear stress. As an example, fluids are liquids, gases, plasma. In an embodiment the fluid is blood. The term "fluid-caused force" denotes a force, which is acting on the rotor assembly due to the movement of the fluid around or through the rotor assembly.

The term "salient" (first, second, . . . ) denotes the magnetic material defining a magnetic pole (first, second, . . . ), which comprises a combination of a permanent magnet and a magnetic material. The first salient denotes the part of magnetic material plus permanent magnet surrounded by the coil. Magnetic material denotes all paramagnetic or ferromagnetic materials, preferably the magnetic material is a ferromagnetic material. Preferably the first salient is arranged at a position, which projection along the rotational axis is inside the surface of the rotor assembly facing towards the bearing assembly and the position is at least close to the outer diameter of this surface of the rotor assembly. With a first salient (and therefore the first magnetic pole) at this position the applied electromagnetic force maximizes the tilting torque applicable to the rotor assembly, especially when using at least four electromagnetic unit. On the other hand, a certain required tilting torque can be achieved by a smaller electromagnetic flux (or force) resulting in a lesser power consumption while achieving the same effect for correcting the rotation. In an embodiment the first salient is shaped as a shoe seen in direction from the rotor assembly in order to increase the permanent first magnetic flux as well as to increase the available space for arranging the coil around the salient, which reduces the power consumption and increases the maximum force generated by the active magnetic bearing.

The magnetic flux denotes the magnetic field passing through a surface. The first magnetic flux is defined by the magnetic field passing the salient area parallel to the bearing surface facing towards the rotor assembly. The closed magnetic flux denotes one closed cycle of the magnetic field. A magnetic flux causes a force acting on a body in case of comprising magnetic material. The magnetic flux denotes the first (or second) magnetic flux established by the permanent magnets inside the bearing assembly. There are no permanent magnets arranged inside the rotor assembly contributing to the first magnetic flux and to a second magnetic flux. The electromagnetic flux is established by operating the coils inside the bearing assembly. The first magnetic flux inside the inter-yoke and correspondingly inside the rotor assembly is directed from one salient of the electromagnetic unit to the adjacent salient of the adjacent electromagnetic unit both arranged in a more or less circular arrangement around the central structure of the bearing assembly resulting in first magnetic flux inside the rotor assembly in a more or less tangential direction of the rotating the circular rotor assembly.

The electromagnetic units of the bearing assembly are connected by one integral inter-yoke denoting the magnetic material not being part of the salient. As seen in a direction from the rotor assembly towards the bearing assembly, the inter-yoke is mainly arranged on the backside of the coils comprising magnetic material at least partly. The inter-yoke is divided into inter-yoke portions, which might be in direct contact to each other or might be separated to each other by suitably shaped structure spacers, where the number of inter-yoke portions equals the number of present electromagnetic units within the bearing assembly. In order to provide at least the specified closed first magnetic fluxes, the number of electromagnetic units has to be an even number of two, four, six, eight or more electromagnetic units. A minimum number of two electromagnetic units is required to achieve a stable position of the rotor assembly inside the levitation range. With two electromagnetic units adaptable axial forces and tilting torques can be applied to the rotor assembly in order to adjust the bearing provided by the first magnetic flux. In an embodiment, the even number of electromagnetic units is at least four enabling the more precise application of an adaptable tilting torque to the rotor assembly in order to adjust the bearing provided by the first magnetic flux.

The central structure denotes the structure for mounting the bearing within a housing and/or for providing a fluid channel towards the rotor assembly or towards the inlet opening.

The active magnetic rotor-bearings assembly according to the present invention provides a high static attraction force due to the present permanent first magnetic flux according to the present invention enabling the possibility to avoid extra permanent magnetic bearings for radial stability of the rotor due to its position stabilizing portion perpendicular to the attractive force. It controls at least one translational axis and at least two rotational axis of the rotor assembly. The bearing magnet according to the present invention only comprises permanent magnets arranged above the rotor assembly with respect to the rotational axis of the rotor assembly. Therefore the present rotor-bearing assembly is less a complex assembly. The arrangement of the permanent magnet within the salient and the present inter-yoke in the active magnetic rotor-bearings assembly according to the present invention provides an attractive first magnetic force, which is stronger compared to solutions disclosed in prior art because of the negative stiffness behavior of the claimed rotor-bearings assembly, which subsequently requires less power consumption and provides a more stable rotation of the rotor assembly. This simplifies the bearing controlling and further reduces the power consumption during operation. In case of blood pumps the rotor-bearing assembly according to the present invention only requires 0.4 W to rotate the rotor assembly stable over long life time.

Therefore the present invention provides a bearing concept with improved bearing properties, while the bearing layout is less complex enabling a more compact product size, has a less power consumption during operation and has a less impact on the pumped fluid.

In an embodiment the first poles of the first salient of adjacent electromagnetic units are opposite to each other. In another embodiment the strengths of the permanent magnets (of the first salient) are adapted to provide at least partly saturated inter-yoke portions. This provides a strong first magnetic force acting on the rotor, reduces the electromagnetic flux coupling between the main poles (first pole) of adjacent electromagnetic units and strengthens the permanent first magnetic flux closed over the salient of adjacent electromagnetic units. In another embodiment the permanent magnets are bodies with a small thickness (seen in direction towards the rotor-assembly) and a large extension parallel to the rotor-assembly. The larger the extension of the permanent magnet parallel to the rotor-assembly and the thinner the permanent magnet perpendicular to said extension, the lower are the magnetic stray fields at the outer edges of the permanent magnet, which reduces any disturbance of the bearing caused by the magnetic stray fields. In another embodiment, the saturated parts of the inter-yoke portions are located in the vicinity of the interface between adjacent inter-yoke. In another embodiment the saturated part are located adjacent to the structure spacers between adjacent inter-yoke portions.

In an embodiment adjacent inter-yoke portions are separated from each other by a structure spacer with a magnetic permeability lower than the magnetic permeability of the inter-yoke portions. The structure spacer are able to reduce the electromagnetic flux coupling between the main poles (first pole) of adjacent electromagnetic units depending on its material and thickness between the inter-yoke portions, which even more simplifies the bearing controlling and further reduces the power consumption during operation.

In another embodiment the structure spacer are permanent magnets with an orientation adding an extra magnetic flux to the first magnetic flux. This further reduces the electromagnetic flux coupling between the main poles (first pole) of adjacent electromagnetic units and further strengthens the permanent first magnetic flux closed over the salient of adjacent electromagnetic units.

In another embodiment the rotor-bearing assembly is arranged to enable adjustment of the electromagnetic flux of each electromagnetic unit independently from each other. Here the electromagnetic units are connected to a bearing control independently. This enables to adapt the additional axial forces and/or tilting torques locally different for different areas of the rotor assembly.

In another embodiment the electromagnetic units each comprise a second salient arranged between the coil and the central structure of the bearing assembly connected to the inter-yoke portions of the corresponding electromagnetic unit providing a second magnetic pole via a closed second magnetic flux via the first salient, the inter-yoke portion and the second salient of the same electromagnetic unit and the rotor assembly providing an second attractive force on the rotor-assembly. Preferably the second salient does not comprise a permanent magnet in contrast to the first salient. Due to the arrangement of the second salient between coil and central structure the second magnetic flux within the inter-yoke portion and the rotor assembly is directed perpendicular to the direction of the first magnetic flux within the parts, where the magnetic fluxes are directed parallel to the rotor surface facing towards the bearing assembly, providing a strong additional attractive force to the rotor assembly resulting in an even better stability of the rotor assembly during rotation.

In another embodiment the rotor assembly comprises a planar bearing plate facing towards the bearing assembly, where the path of first magnetic flux within the rotor assembly (and also the second magnetic flux, if present) is only located inside the bearing plate not comprising any permanent magnets. Here the first magnetic fluxes are closed in shorter paths with a higher flux density inside the rotor assembly compared to rotor assemblies, where the magnetic flux extends through the whole rotor, which further improves the applied attractive magnetic forces. Permanent magnets within the bearing plate are not required to achieve the demanded bearing behavior.

In another embodiment the rotor assembly comprises a blade unit comprising blades to pump the fluid, which is arranged between a bearing plate and a motor plate comprising multiple suitable arranged permanent magnets to couple in a motor force, wherein the bearing plate and the motor plate are planar cylindrical bodies aligned parallel to each other. The rotor assembly conveys the fluid through the blade unit enabling to a rotor assembly design with flat top (bearing plate) and bottom (motor plate) surfaces. The rotation of such a rotor assembly with flat top and bottom surfaces can be controlled much easier to achieve a good stability of the rotor assembly during operation and less power consumption of the bearings assembly.

In a preferred embodiment the bearing plate and the motor plate have equal thicknesses parallel to a rotational axis of the rotor assembly. Such a rotor assembly design leads to fluid caused forces, which magnitude does not or only marginal depends on the speed and the velocity dynamics of the conveyed fluid within the fluid pump. Such a rotor assembly can be controlled even more easier with the present bearing assembly.

The invention further relates to a fluid pump comprising a housing having an inlet opening for receiving the fluid and an outlet opening for discharging the fluid, an active magnetic rotor-bearing assembly according to the present invention with a rotor assembly to pump the fluid from the inlet opening through the rotor assembly to the outlet opening and a bearing assembly to enable a contactless rotating the rotor assembly inside the housing, and a motor assembly to drive the rotor assembly, where the rotor assembly has an open central structure connected to the outlet opening for discharging the fluid. People skilled in the art are able to shape the housing including selection of the suitable material of the housing accordingly to the particular application of the fluid pump as well as provide suitable layouts for the required motor assembly. For the same reasons as described before the present invention provides a fluid pump enabling the rotor assembly of the pump to rotate more stable, while the bearing layout is less complex enabling a more compact product size and less power consumption during operation. The magnetic flux inside the rotor assembly generated by the motor assembly is spatial separated from the magnetic fluxes (first magnetic flux, second magnetic flux, electromagnetic flux) generated by the bearing assembly. The path of the magnetic flux inside the rotor assembly generated by the motor assembly is located close to the surface of the rotor assembly facing towards the motor assembly, while the paths of the magnetic fluxes inside the rotor assembly generated by the bearing assembly are located at or close to the surface of the side of the rotor assembly facing towards the bearing assembly not interfering with the magnetic fluxes generated by the motor assembly.

In another embodiment the rotor assembly comprises a blade unit comprising blades to pump the fluid, which is arranged between a bearing plate and a motor plate comprising multiple suitable arranged permanent magnets to couple in a motor force provided by the motor assembly, wherein the bearing plate and the motor plate are planar cylindrical bodies aligned parallel to each other. The flat cylindrical bodies enable a small gap between motor assembly and motor plate of the rotor assembly increasing the motor force applied to the rotor assembly when operating the motor assembly at the same condition. In a preferred embodiment the permanent magnets within the motor plate are arranged in a Halbach array further increasing the flux linkage and attraction force with respect to the motor assembly comprising electromagnets to drive the rotor assembly.

In another embodiment of the fluid pump the bearing plate and the motor plate have equal thicknesses parallel to a rotational axis of the rotor assembly. Such a rotor assembly design leads to fluid caused forces, which magnitude does not or only marginal depends on the speed and the velocity dynamics of the conveyed fluid within the fluid pump. Such a rotor assembly can be controlled even more easier with the present bearing assembly.

In another embodiment the blades at least partly extend from the bearing plate to the motor plate with fluid channels between the blades, where the shape of each fluid channel is defined by the adjacent blades, where the shapes of the blades are adapted to reduced a radially directed portion of the fluid caused force to a value smaller than the radial force applicable by the bearing assembly when pumping the fluid. With these blades a fully compensation of the radially directed portion of the fluid caused force is enabled further reducing the control effort when operating the bearing assembly.

In another embodiment at least the bearing plate and the blade unit comprise inner holes around the central structure, where the inner hole of the bearing plate has a larger diameter as the inner hole of the blade unit. This layout improves the fluid properties for entering the outlet opening. In another embodiment the central structure provides a hole through the entire rotor assembly further simplifying the manufacturing process.

In another embodiment the fluid pump further comprises position sensors to detect the position of the rotor assembly and a control unit receiving rotor position data from the position sensors and controlling the bearing assembly in response to the received rotor position data. A feedback controlled operation provides the most stable position of the rotor assembly during operation. The position sensors are arranged at suitable positions within the housing of the fluid pump. People skilled in the art are able to select suitable position sensors and its position inside the housing of the fluid pump.

In another embodiment the rotor assembly has a levitation position between the motor assembly and the bearing assembly within a levitation range extending from a first levitation range limit between rotor assembly and bearing assembly to a second levitation range limit between rotor assembly and motor assembly and where the control unit is adapted to prevent the levitation position of the rotor assembly from leaving the levitation range by suitably adjusting the electromagnetic flux provided by one or more coils of the electromagnetic units of the bearing assembly. The control unit together with the predefined levitation range enables an operation of the fluid pump at large gaps between the rotor assembly and the surrounding components, especially the bearing assembly and the motor assembly. In a preferred embodiment the control unit is adapted to allow a varying levitation position of the rotor assembly within the levitation range without applying the electromagnetic flux to the rotor assembly as long as all forces acting on the rotor assembly provide stable position (levitation position) within the levitation range without any applied electromagnetic flux. This enables to minimize the current of the coils or even apply no current to the coils in order to save energy and provide an energy efficient fluid pump.

In another embodiment, the fluid pump is a blood pump for conveying blood as the fluid suitable for implanting it into human bodies.

The invention further relates to a method to operate an active magnetic rotor-bearing assembly according to the present invention for conveying a fluid comprising a rotor assembly driven by a motor assembly and a bearing assembly comprising an even number of electromagnetic units arranged around a central structure of the bearing assembly each comprising a first salient established by a magnetic material and a permanent magnet at least magnetically connected to the magnetic material providing a first pole facing towards the rotor assembly and a coil wound around the first salient, where the bearing assembly further comprises an inter-yoke comprising inter-yoke portions connected to the first salient of each electromagnetic unit, comprising the steps of:

contactless bearing the rotor assembly by providing a closed first magnetic flux via the first salient and the inter-yoke portions of the both adjacent electromagnetic units and the rotor assembly applying a first attractive force further comprising a position stabilizing portion perpendicular to the first attractive force on the rotor-assembly using suitably arranged permanent magnets of the first salient; and balancing the bearing provided by the first magnetic flux by an electromagnetic flux between each first salient and the rotor assembly to apply an adaptable axial force and/or tilting torque to the rotor assembly.

In an embodiment the method further comprises the step of providing a strong additional attractive force to the rotor assembly resulting in an even better stability of the rotor assembly during rotation by arranging a second salient between the coil and the central structure of the bearing assembly connected to the inter-yoke portions of the corresponding electromagnetic unit providing a second magnetic pole via a closed second magnetic flux via the first salient, the inter-yoke portion and the second salient of the same electromagnetic unit and the rotor assembly providing an second attractive force on the rotor-assembly. Due to the arrangement of the second salient between coil and central structure the second magnetic flux within the inter-yoke portion and the rotor assembly is directed perpendicular to the direction of the first magnetic flux within the parts, where the magnetic fluxes are directed parallel to the rotor surface facing towards the bearing assembly, providing a strong attractive force to the rotor assembly resulting in an even better stability of the rotor assembly during rotation.

In an embodiment the method further comprises the step of preventing the levitation position of the rotor assembly from leaving the levitation range by suitably adjusting the electromagnetic flux provided by one or more coils of the electromagnetic units of the bearing assembly by the control unit. In a preferred embodiment the control unit minimizes the required current to adjust the electromagnetic flux by allowing a variation of the levitation position of the rotor assembly within the levitation range without applying the electromagnetic flux to the rotor assembly as long as all forces acting on the rotor assembly provide a balanced levitation position within the levitation range without any applied electromagnetic flux.

The invention further relates to a method for operating a blood pump suitable for implanting it into human bodies for conveying blood as the fluid, wherein the method comprise the steps of the method to operate an active magnetic rotor-bearing assembly according to the present invention.

BRIEF DESCRIPTION OF THE DRAWINGS

The aforementioned and other aspects of the invention will also be apparent from and elucidated with reference to the embodiments of the invention described herein after making reference to the drawings.

DETAILED DESCRIPTION OF EMBODIMENTS

Figure 1:
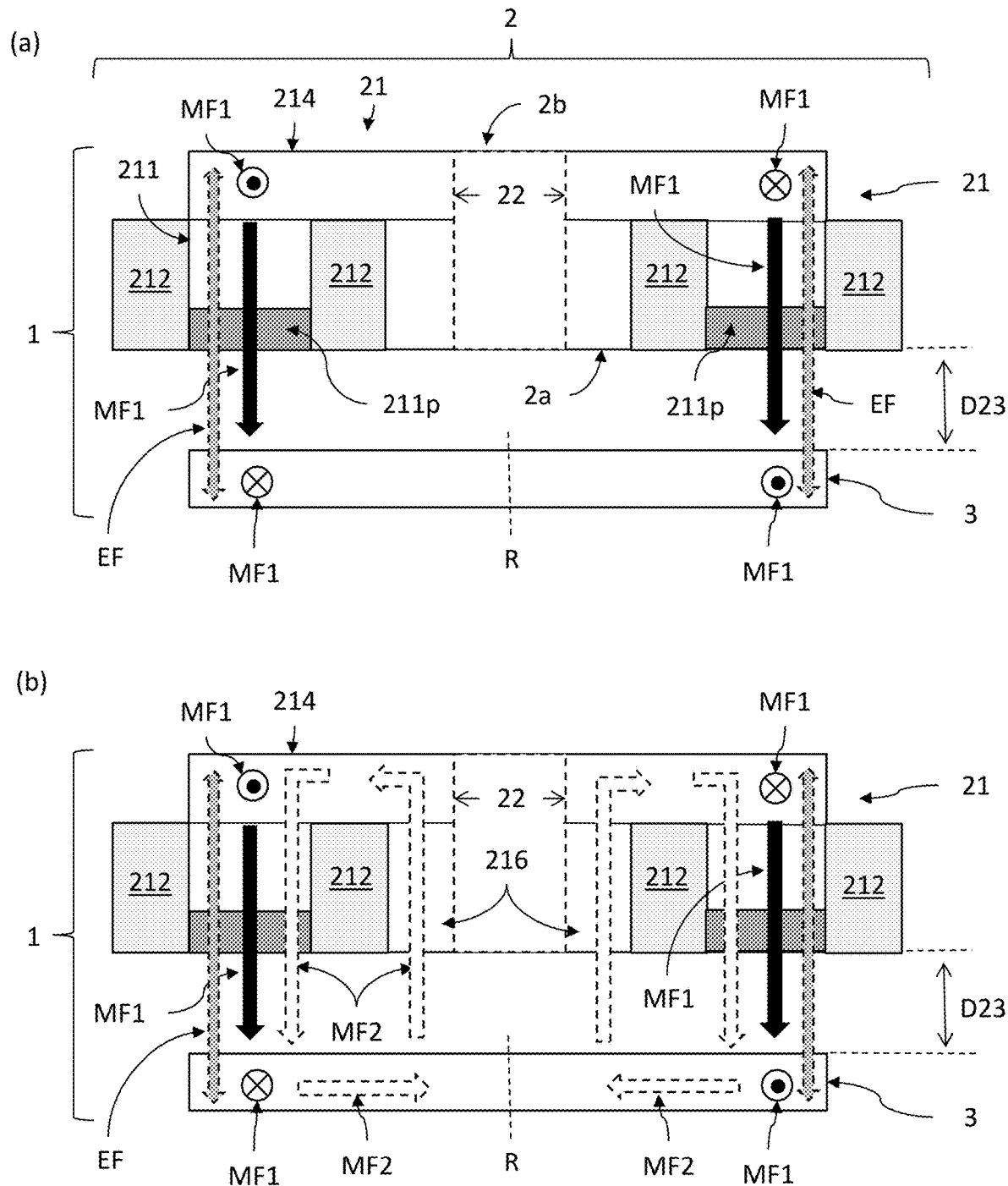
FIG. 1: an embodiment of the rotor-bearing assembly according to the present invention in a side view (a) without a second salient and (b) with a second salient.

FIGS. 1a and 1b show two different embodiments of the rotor-bearing assembly 1 according to the present invention in a side view comprising a rotor assembly 3 and a bearing assembly 2 for contactless bearing the rotor assembly 3. In the following the rotor-bearing assembly 1 as shown in FIG. 1a is described. Here the bearing assembly 2 comprises an even number of four electromagnetic units 21 (see also FIG. 4) arranged around a central structure 22 of the bearing assembly 2, where only the left and right electromagnetic units 21 are shown here due to the displayed side view. Each electromagnetic unit 21 comprises a first salient 211 established by a magnetic material 211m and a permanent magnet 211p magnetically connected to each other providing a first magnetic pole P1 facing towards the rotor assembly 3. The first salient 211 denotes the part of the magnetic material including the permanent magnet 211p, which is arranged inside the coil 212 or closely above or below the coil 212 in a direction parallel to the rotational axis R of the rotor assembly 3. The other magnetic material outside the first and second salient 211, 216 is denoted as inter-yoke 213 or inter-yoke portion 214. The coil 212 is wound around the first salient 211, where the bearing assembly 2 further comprises an inter-yoke 213 comprising inter-yoke portions 214 connected to the first salient 211 of each electromagnetic unit 21, where the permanent magnets 211p of adjacent electromagnetic unit 21 are suitably arranged to provide a closed first magnetic flux MF1 (black arrow) via the first salient 211 and the inter-yoke portions 214 of the both adjacent electromagnetic units 21 and the rotor assembly 3 shown as black arrow perpendicular to the surface of the rotor assembly 3 within the salient 211 and parallel to the surface of the rotor assembly 3 inside the inter-yoke 213 and the rotor assembly 3 itself in a tangential direction with respect to the rotor assembly 3 indicated by black circular dots MF1 and circular crosses MF1 above and below the black arrows MF1. The first magnetic flux MF1 applies a first attractive force further comprising a position stabilizing portion perpendicular to the first attractive force on the rotor-assembly 3 for compensating at least present motor and fluid-caused forces at least at a levitation position of the rotor-bearing assembly 1. Extra permanent magnets in addition to the shown permanent magnet 211p are not necessary to provide a sufficient radial stability of the rotor assembly 3 by the bearing assembly 2. The coils 212 provide electromagnetic fluxes EF between each first salient 211 and the rotor assembly 3 for applying adaptable axial force and tilting torque to the rotor assembly 3 in order to adjust B (see FIG. 7) the compensation provided by the first magnetic flux MF1 to at least prevent the levitation position LP of the rotor assembly 3 from leaving the levitation range LR (see FIG. 8 for more details). Here the rotor-bearing assembly 1 is adapted to enable adjustment of the electromagnetic flux EF of each electromagnetic unit 21 independently from each other. The side of the bearing assembly 2 facing towards the rotor assembly 3 is denotes as "2a". The opposite side of the bearing assembly 2 is denoted as "2b". In FIG. 1a the space between the central structure 22 and the coil 212 might be empty of filled with a non-magnetic and electrically insulating material.

In contrast to FIG. 1a the electromagnetic units 21 of FIG. 1b each comprise further a second salient 216. All other hardware parts are identical to FIG. 1a. For ease of understanding, some hardware parts are not indicated by reference numbers in FIG. 1b. For these hardware parts we refer to FIG. 1a. The second salient 216 are arranged between the coil 212 and the central structure 22 of the bearing assembly 2 connected to the inter-yoke portions 214 of the corresponding electromagnetic unit 21 providing a second magnetic pole P2 via a closed second magnetic flux MF2 via the first salient 211, the inter-yoke portion 214 and the second salient 216 of the same electromagnetic unit 21 and the rotor assembly 3 providing an second attractive force on the rotor-assembly 3. The path of the second magnetic flux MF2 inside the bearing assembly 2 is limited to each electromagnetic unit 21. The second magnetic flux MF2 of one electromagnetic unit 21 does not enter adjacent electromagnetic units 21. In contrast to the first magnetic flux MF1, the second magnetic flux MF2 inside the rotor assembly 3 is directed into a radial direction of the rotor assembly 3 with respect to the rotational axis R.

Figure 2:
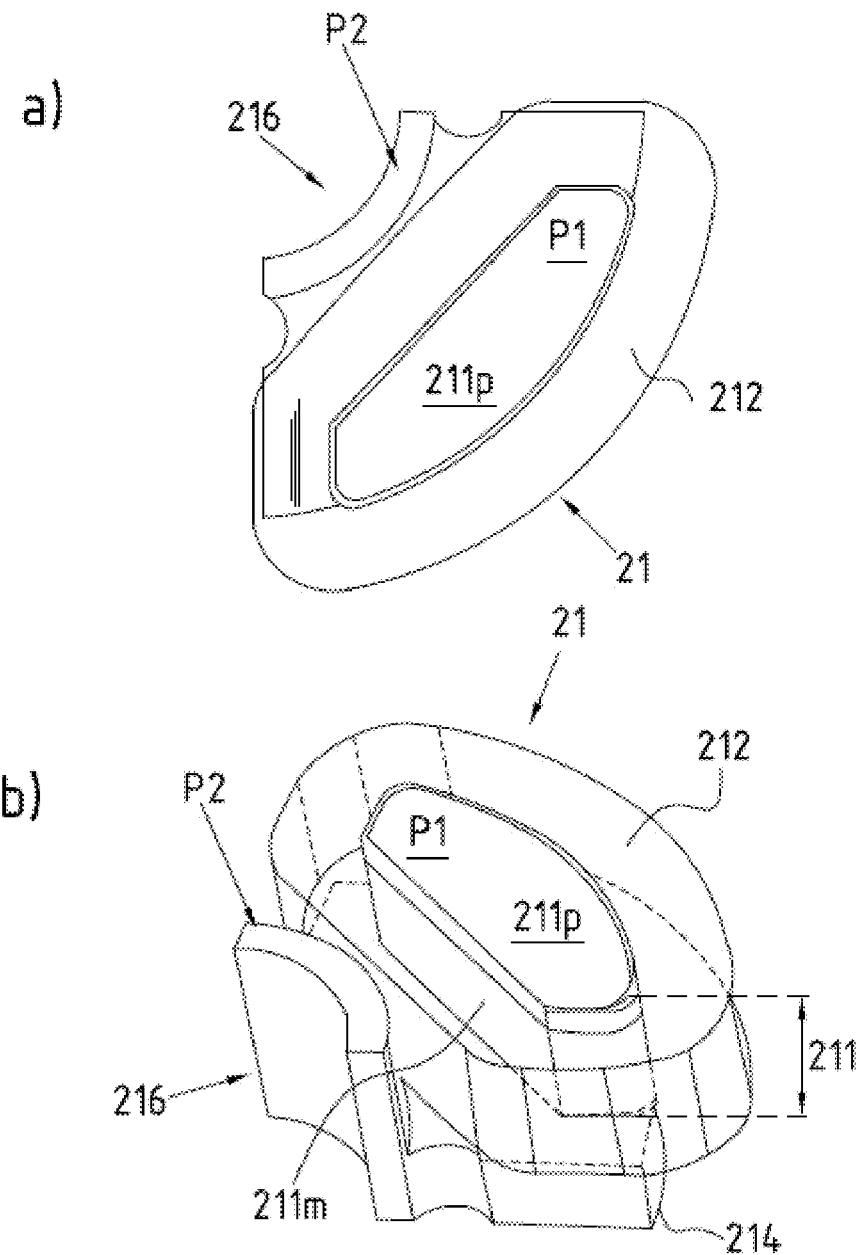
FIG. 2: an embodiment of the electromagnetic unit of the bearing assembly according to the present invention (a) in a top view as seen from the rotor assembly and (b) in a corresponding perspective view.

FIG. 2 shows an embodiment of the electromagnetic unit 21 of the bearing assembly 1 according to the present invention (a) in a top view as seen from the rotor assembly 3 and (b) in a corresponding perspective view. To provide the closed circular first magnetic flux MF1 the first poles P1 of the first salient 211 of adjacent electromagnetic units 21 are arranged as opposite poles P1 to each other. In this embodiment the first salient 211 is shaped as a protrusion having a shoe-like surface in order to increase the permanent first magnetic flux MF1 as well as to increase the available space for arranging the coil 212 around the first salient 211, which reduces the power consumption and increases the maximum force generated by the active magnetic bearing 1. Since common rotor assemblies have a more or less circular shape perpendicular to the rotational axis R, the curvature of the shoe is adapted to the circular outer shape of the rotor assembly 3. Correspondingly the central structure 22 (not explicitly shown here, see FIG. 1) of the bearing assembly 2 also has a circular shape resulting in a second salient 216 between coil 212 and central structure 22 being shaped as a ring shaped protrusion extending from the inter-yoke portion 214. First and second pole P1, P2 of the first and second salient 211, 216 as well as the upper side of the coil 212 facing towards the rotor assembly 3 (not shown here) are arranged at the same height level forming a flat plane 2a facing towards the rotor assembly 3. The area between second salient 216 and coil 212 might be filled up with a non-magnetic and electrically insulating material.

Figure 3:
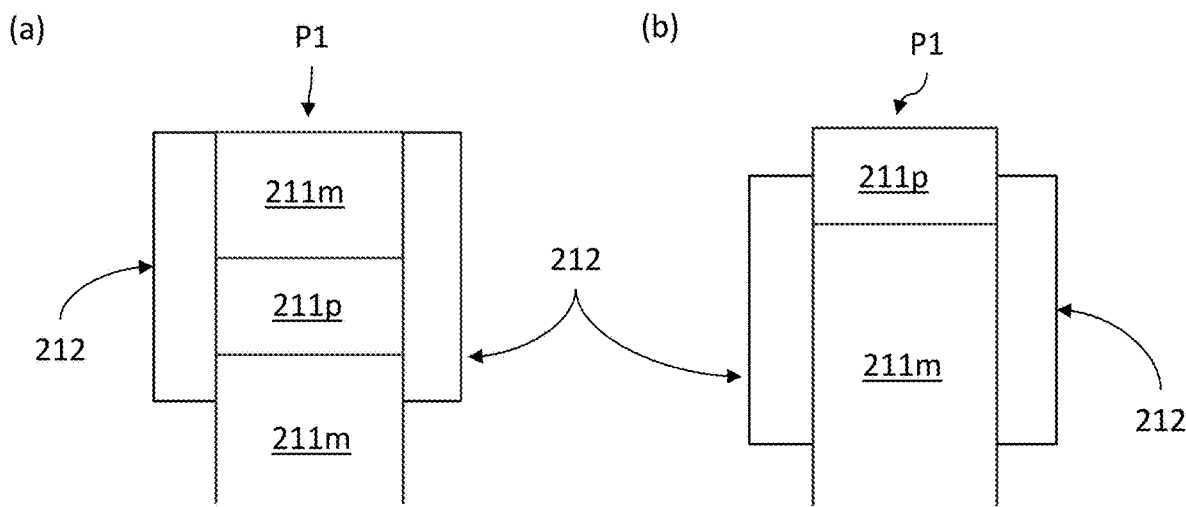
FIG. 3: two embodiment of the first salient with (a) the permanent magnet arranged in between the magnetic material of the salient and (b) the permanent magnet arranged on top of the magnetic material forming the surface towards the rotor assembly.

FIG. 3 shows two embodiment of the first salient 211 with (a) the permanent magnet 211p arranged in between the magnetic material 211m of the salient 211 and (b) the permanent magnet 211p arranged on top of the magnetic material 211m forming the surface towards the rotor assembly 3. The first salient 211 establishes a first magnetic pole P1 at the surface of the first salient 211 facing towards the rotor assembly (not shown here). On the opposite side of the first salient 211, the inter-yoke portion 214 is connected to the first salient 211 (not shown here). This opposite side 2b of the salient 211, 216 is also denoted as backside of the coil 212 or of the electromagnetic unit 21.

Figure 4:
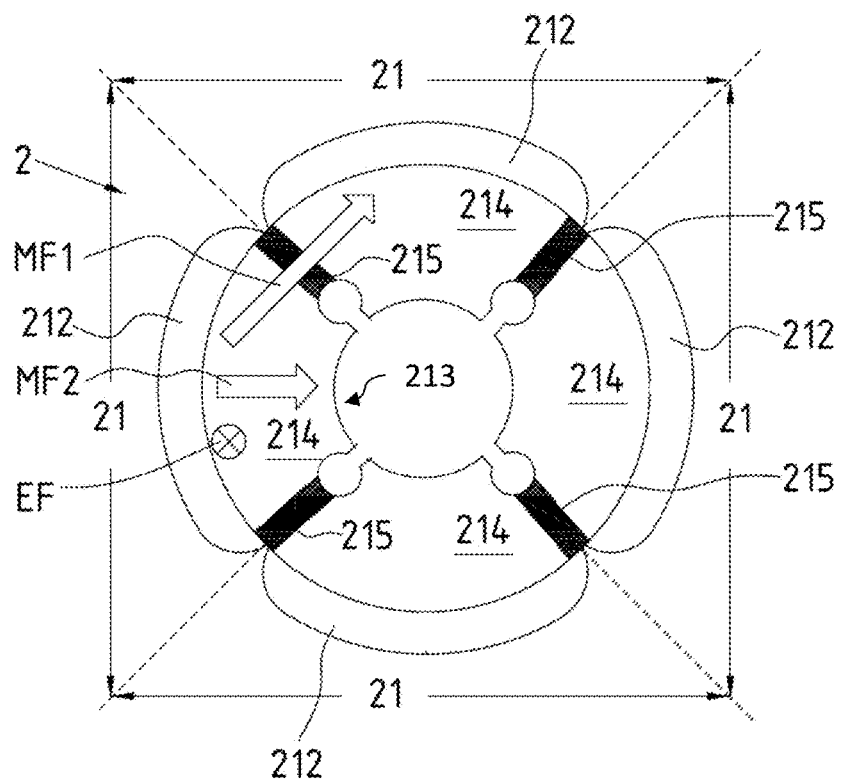
FIG. 4: an embodiment of the bearing assembly according to the present invention in a top view on the side facing away from the rotor assembly.

FIG. 4 shows an embodiment of the bearing assembly 2 according to the present invention in a top view on the side facing away from the rotor assembly 3. The bearing assembly 2 comprises an inter-yoke 213 comprising inter-yoke portions 214, which are separated from each other by structure spacers 215 (black areas) in this embodiment. The inter-yoke 213 is connected to the first salient 211 of each electromagnetic unit 21 (not explicitly shown here, because the first salient 211 are covered by the inter-yoke 213 in this view). The structure spacers 215 are made of a material having a magnetic permeability lower than the magnetic permeability of the inter-yoke portions 214. The permanent magnets 211p of adjacent electromagnetic units 21 are suitably arranged to provide a closed first magnetic flux MF1 (indicated as white arrow) via the first salient 211 and the inter-yoke portions 214 of the both adjacent electromagnetic units 21 via the structure spacer 215 and the rotor assembly 3 with a tangential direction inside the inter-yoke 213 and the rotor assembly 3 applying a first attractive force further comprising a position stabilizing portion perpendicular to the first attractive force on the rotor-assembly. In case of present second salient 216, a closed second magnetic flux MF2 is generated in radial direction of bearings assembly 2 and rotor assembly 3 as indicated by the second white arrow. However the strengths of the permanent magnets 211p inside the first salient 211 are adapted to provide saturated part of the inter-yoke portions 214 at least adjacent to the structural spacers 215. Furthermore the bearing assembly 2 is adapted to enable adjustment of the electromagnetic flux EF of each electromagnetic unit 21 directed towards the rotor assembly or in the opposite direction independently from each other. The electromagnetic flux EF is indicated here as crossed circle directing inside the displayed figure. For other electromagnetic units 21 the electromagnetic flux EF might be directed as pointing outside the figure or in the opposite direction. The current given to each of the coils 212 provide a local axial force and a local tilting torque on the rotor assembly providing a very accurate balancing of the rotor assembly in combination with the permanent first magnetic fluxes MF1 within the levitation range LR for the levitation position LR of the rotor assembly 3. In another embodiment the structure spacer 215 are also permanent magnets with an orientation adding an extra magnetic flux to the first magnetic flux MF1.

Figure 5:
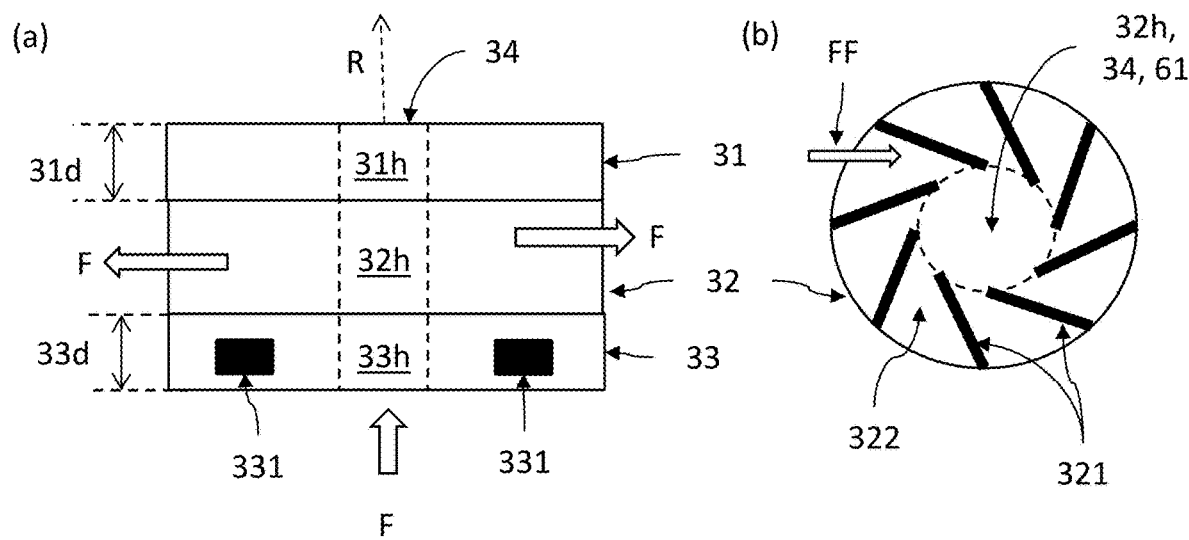
FIG. 5: an embodiment of the rotor assembly according to the present invention (a) in a side view and (b) in a top view, where only the blade unit is displayed in details.

FIG. 5 shows an embodiment of the rotor assembly 3 according to the present invention (a) in a side view and (b) in a top view, where only the blade unit 322 is displayed in details. The rotor assembly 3 comprises a planar bearing plate 31 facing towards the bearing assembly 2, where the path of first magnetic flux MF1 within the rotor assembly 3 is only located inside the bearing plate 31 not comprising any permanent magnets. The rotor assembly 3 further comprises a blade unit 32 comprising blades 321 to pump the fluid 4, which is arranged between the bearing plate 31 and a motor plate 33, where only the motor plate 33 comprises multiple suitable arranged permanent magnets 331 to couple in a motor force. The permanent magnets 331 might be arranged in a Halbach array in order to increase the flux linkage with the motor assembly and the correspondingly applied attractive force towards the motor assembly. In this embodiment the bearing plate 31 and the motor plate 33 are planar cylindrical bodies aligned parallel to each other. In this embodiment the bearing plate 31 and the motor plate 33 are planar cylindrical bodies aligned parallel to each other having equal thicknesses 31d, 33d parallel to a rotational axis (R) of the rotor assembly 3 in order to reduce variations of the fluid caused axial force caused by varying pump speed and/or varying pump flow. The blade unit 32 comprises blades 321 to pump the fluid F, which at least partly extend from the bearing plate 31 to the motor plate 33 with fluid channels 322 between the blades 321, where the shape of each fluid channel 322 is defined by the adjacent blades 321, where the shapes of the blades 321 are adapted to reduced a radially directed portion of the fluid caused force FF when pumping the fluid F to a value smaller than the radial force applicable by the bearing assembly 2. Furthermore at least the bearing plate 31 and the blade unit 32 may comprise inner holes 31h, 32h around the central structure 34, where the inner hole 31h of the bearing plate 31 may has a larger diameter as the inner hole 32h of the blade unit 32. In another embodiment also the motor plate 33 may have an inner hole 33h. The bearing plate might be made of iron, laminated steel and/or SMC (soft magnetic composite) in order to reduce eddy current losses.

Figure 6:
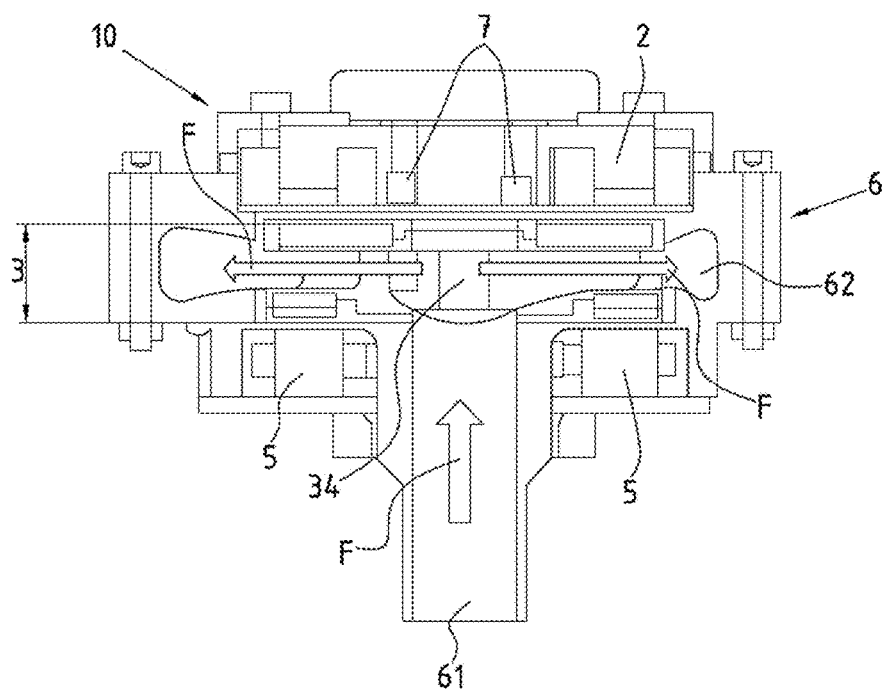
FIG. 6: a blood (fluid) pump according to the present invention.

FIG. 6 shows a blood (fluid) pump 10 according to the present invention. The fluid pump 10 comprises a housing 6 having an inlet opening 61 for receiving the fluid F and an outlet opening 62 for discharging the fluid F, an active magnetic rotor-bearing assembly according to the present invention with a rotor assembly 3 to pump the fluid F from the inlet opening 61 through the rotor assembly 3 to the outlet opening 62 and a bearing assembly 2 to enable a contactless rotating the rotor assembly 3 inside the housing 6. Furthermore the fluid pump 10 comprises a motor assembly 5 to drive the rotor assembly 3, where the rotor assembly 3 has an open central structure 34 connected to the outlet opening 62 for discharging the fluid F. In this embodiment the bearing plate 31, the blade unit 32 and the motor plate 33 comprise inner holes 31h, 32h, 33h around the central structure 34. The fluid pump 10 further comprises position sensors 7 to detect the current position of the rotor assembly 3 and a control unit 8 receiving rotor position data 71 from the position sensors 7 and controlling CN the bearing assembly 2 in response to the received rotor position data 71. The gap between rotor assembly and housing might by within the range of 200 μm and 400 μm. In case of blood as the fluid for a blood pump as the fluid pump, the gap between rotor assembly and housing should not decrease under 200 μm in order not to harm the conveyed blood. The size of such a fluid pump 10 can be reduced by using the rotor-bearing assembly 1 in accordance to the present invention down to a height of 20 mm to 23 mm with a diameter of 48 mm, because the rotor-bearing assembly 1 is arranged to levitate the rotor assembly 3 at a levitation position between the bearing assembly 2 and the motor assembly 5, where the sum of the main forces (sum of motor force, fluid caused forces and permanent magnetic forces generated by the bearing assembly) is around zero. The levitation position, where the sum of the main-forces is zero, is a labile position. The force balanced levitation position LP of the rotor assembly 3, where the forces acting onto the rotor assembly 3 adds to zero, may vary between the bearing assembly 2 and the motor assembly 5. Sometimes the force balanced levitation position LP of the rotor assembly 3 is closer to the bearing assembly, sometimes it is closer to the motor assembly. However it shall be prevented that the rotor assembly 3 comes to close to the bearing assembly 2 or to close to the motor assembly or even touch one of the components. Therefore the levitation position LP of the rotor assembly 3 shall stay within a levitation range located between the bearing assembly 2 and the motor assembly 5. The applicable electromagnetic flux by the electromagnetic units of the bearing assembly is used to prevent the levitation position of the rotor assembly 3 from leaving the levitation range LR maintaining a certain gap size between rotor assembly 3 and bearing/rotor assembly 2, 5. These properties are especially suitable for blood pumps 10. The force deviations around the zero-value are compensated by applying an additional suitable adaptable force due to the adaptable electromagnetic flux EF in case of the rotor assembly 3 intends to leave the predefined levitation range LR. Therefore the active magnetic bearing only compensate for the fluctuations of the forces and only in case of the rotor assembly 3 approaching the bearing assembly 2 or the motor assembly 5 to close resulting in a very low power consumption of the bearing assembly 2 during operation of the fluid pump 10. Such a pump 10 can be operated at only 0.4 W for the bearing assembly 2.

Figure 7:
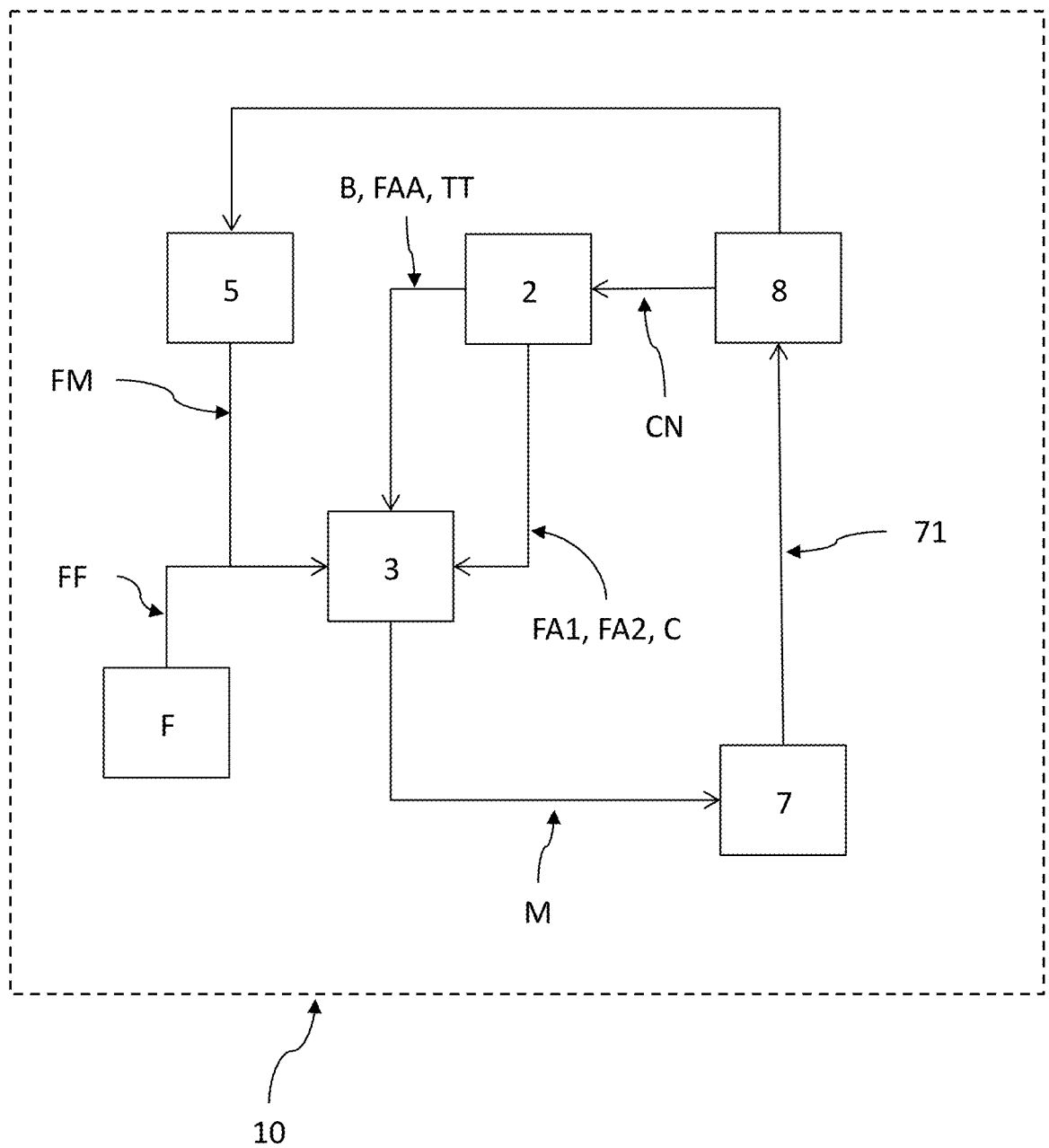
FIG. 7: an embodiment of the method to operate the active magnetic rotor-bearing assembly (fluid pump) according to the present invention.

FIG. 7 shows an embodiment of the method to operate the fluid pump 10 comprising an rotor-bearing assembly 1 according to the present invention for conveying a fluid F comprising a rotor assembly driven by a motor assembly 5 and a bearing assembly 2 for contactless C bearing the rotor assembly 3 comprising the steps of compensating at least present motor and fluid-caused forces FM, FF at a levitation position LP of the rotor-bearing assembly 1 by the bearing assembly 2 by providing a closed first magnetic flux MF1 via the first salient 211 and the inter-yoke portions 214 of the both adjacent electromagnetic units 21 and the rotor assembly 3 applying a first attractive force FA1 further comprising a position stabilizing portion perpendicular to the first attractive force FA1 on the rotor-assembly 3 using suitably arranged permanent magnets 211p of the first salient 211 and balancing B the compensation C provided by the first magnetic flux MF1 within a levitation range LR by an electromagnetic flux EF between each first salient 211 and the rotor assembly 3 to apply an adaptable axial force FAA and tilting torque TT to the rotor assembly. In this embodiment the method further comprises the step of providing a strong attractive force FA2 to the rotor assembly 3 resulting in an even better stability of the rotor assembly 3 during rotation by arranging a second salient 216 between the coil 212 and the central structure 22 of the bearing assembly 2 connected to the inter-yoke 214 portions of the corresponding electromagnetic unit 21 providing a second magnetic pole P2 via a closed second magnetic flux MF2 via the first salient 211, the inter-yoke portion 214 and the second salient 216 of the same electromagnetic unit 21 and the rotor plate 31. Due to the arrangement of the second salient 216 between coil 212 and central structure 22 the second magnetic flux MF2 within the inter-yoke portion 214 and the rotor assembly 3 is directed perpendicular to the direction of the first magnetic flux MF1 providing a strong attractive force FA2 to the rotor assembly 3.

Figure 8:
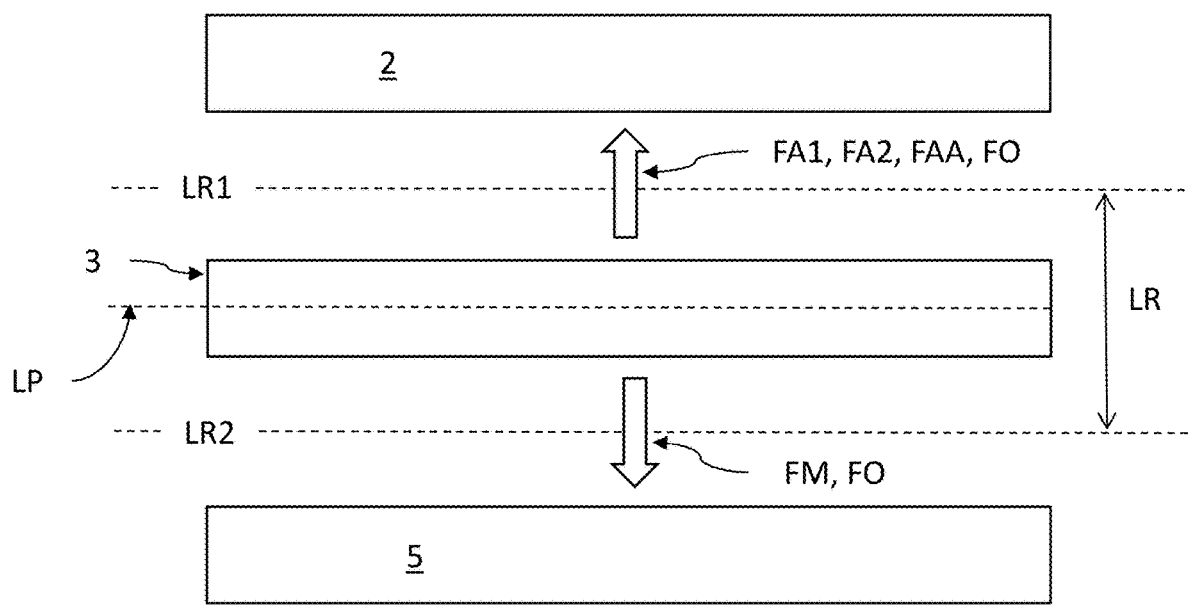
FIG. 8: schematic side view of the rotor-bearing assembly with levitation range and levitation position for the rotor assembly.

FIG. 8 shows a schematic side view of the rotor-bearing assembly 1 comprising the rotor assembly 3, the bearing assembly 2 and the motor assembly 5. For details of these components we refer to the previous figures. The bearing assembly 2 is adapted to provide attractive permanent magnetic forces FA1 (and FA2 if present) acting on the rotor assembly 3. On the other hand, the motor assembly 5 also applies attractive magnetic forces FM onto the rotor assembly 3 in an opposite direction. If there are no other forces FO acting on the rotor assembly 3, the levitation position LP of the rotor assembly 3 may be in the middle position between bearing assembly 2 and motor assembly 5. However, other forces FO like gravity or dynamic forces generated by movement the fluid pump may also act on the rotor assembly 3, where the direction of these forces depends on the general circumstances of the rotor-bearing-assembly like location, orientation, use, movement etc. Therefore some other forces FO may contribute to the attractive forces of the bearing assembly 2 and some other forces FO may contribute to the attractive forces of the motor assembly 5. Therefore the levitation position LP of the rotor assembly 3, where the forces FA1, FM, FO (and FA2 is present) adds to zero may vary within a levitation range LR. The control unit 8 controlling the bearing assembly 2, especially the current of the coils of each of the electromagnetic units to provide an additional adjustable electromagnetic flux EF is arranged to at least prevent the levitation position LP of the rotor assembly 2 from leaving the levitation range LR, e.g. preventing exceeding the first levitation range limit LR1 towards the bearing assembly 2 or the second levitation range limit LR2 towards the motor assembly. The currents of the coils are adapted by the control unit 8 to control the position LP of the rotor assembly 3 parallel to the rotational axis as well as the tilting of the rotor assembly 3 to keep all parts of the rotor assembly 3 within the levitation range LR even in case of a tilted rotor assembly 3. As long as the rotor assembly 3 reaches a force balanced levitation position LP within the levitation range LR without applying current to the coils, the control unit 8 is adapted to minimize the current of the coils or even apply no current to the coils in order to save energy and provide an energy efficient fluid pump. The gaps between first levitation limit LR1 and bearing assembly 2 and between second levitation limit LR2 and motor assembly 5 might be within the range of 200 μm and 400 μm. For Blood pumps these gaps should not decrease under 200 μm.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

LIST OF REFERENCE NUMERALS 1 rotor-bearing assembly
2 bearing assembly
2a side of the bearing assembly facing towards the rotor assembly
2b side of the bearing assembly facing away from the rotor assembly
21 electromagnetic unit
211 first salient
211m magnetic material (of the first salient)
211p permanent magnet (of the first salient)
212 coil
213 inter-yoke
214 inter-yoke portions
215 structure spacer
216 second salient
22 central structure of bearing assembly
3 rotor assembly
31 bearing plate
31d thickness of the bearing plate
31h inner hole of the bearing plate (around the central structure)
32 blade unit
32h inner hole of the blade unit (around the central structure)
321 blades of the blade unit
322 fluid channels (between the blades)
33 motor plate
33d thickness of the motor plate
33h inner hole of the motor plate (around the central structure)
331 permanent magnets within the motor plate
34 central structure of the rotor assembly
4 fluid (to be conveyed)
5 motor assembly
6 housing
61 inlet opening (for the fluid)
62 outlet opening (for the fluid)
7 position sensors
71 rotor position data
8 control unit
10 fluid pump
B balancing the bearing provided by the first and/or second magnetic fluxes by an electromagnetic flux
C contactless bearing of the rotor assembly
CN controlling the bearing assembly by a control unit
D23 gap between bearing assembly and rotor assembly
EF electromagnetic flux
FA1 first attractive force
FA2 second attractive force
FAA adaptable axial force
FF fluid-caused force
FM motor force
FO other forces acting on the rotor assembly
LP levitation position
LR levitation range for the rotor assembly between bearing and motor assembly
LR1 first levitation range limit towards the bearing assembly
LR2 second levitation range limit towards the motor assembly
MF1 first magnetic flux
MF2 second magnetic flux
M detecting (measuring) the rotor position
P1 first magnetic pole
P2 second magnetic pole
R Rotational axis
TT tilting torque

The invention claimed is:

1. An active magnetic rotor-bearing assembly for conveying a fluid comprising a rotor assembly driven by a motor assembly and a bearing assembly for contactless bearing the rotor assembly to pump the fluid from an inlet opening through the rotor assembly to an outlet opening, wherein the bearing assembly comprises an even number of electromagnetic units arranged around a central structure of the bearing assembly, which provides a fluid channel towards the rotor assembly, each comprising a first salient established by a magnetic material and a permanent magnet at least magnetically connected to the magnetic material providing a first magnetic pole facing towards the rotor assembly and a coil wound around the first salient, where the bearing assembly further comprises an inter-yoke comprising inter-yoke portions connected to the first salient of each electromagnetic unit, where the permanent magnets of adjacent electromagnetic units are suitably arranged to provide a closed first magnetic flux via the first salient and the inter-yoke portions of the both adjacent electromagnetic units and the rotor assembly applying a first attractive force acting on the rotor-assembly for compensating at least present motor and fluid-caused forces at a levitation position of the rotor assembly further comprising means for a position stabilizing portion perpendicular to the first attractive force on the rotor-assembly, and the coils providing an electromagnetic flux between each first salient and the rotor assembly for applying adaptable axial force and/or tilting torque to the rotor assembly keeping the rotor within a levitation range during rotation and compensating the current motor force and fluid-caused forces during any fluctuation and any additional forces in order to adjust the bearing provided by the first magnetic flux, wherein adjacent inter-yoke portions are separated from each other by a structure spacer with a magnetic permeability lower than a magnetic permeability of the inter-yoke portions, wherein the structure spacer is a permanent magnet with an orientation adding an extra magnetic flux to the first magnetic flux.

2. The rotor-bearing assembly according to claim 1, wherein the strengths of the permanent magnets are adapted to provide at least partly saturated inter-yoke portions.

3. The rotor-bearing assembly according to claim 1, wherein the rotor-bearing assembly is arranged to enable adjustment of the electromagnetic flux of each electromagnetic unit independently from each other.

4. The rotor-bearing assembly according to claim 1, wherein the electromagnetic units each comprise a second salient arranged between the coil and the central structure of the bearing assembly connected to the inter-yoke portions of the corresponding electromagnetic unit providing a second magnetic pole via a closed second magnetic flux via the first salient, the inter-yoke portion and the second salient of the same electromagnetic unit and the rotor assembly providing an second attractive force on the rotor-assembly.

5. The rotor-bearing assembly according to claim 1, wherein the rotor assembly comprises a planar bearing plate facing towards the bearing assembly, where the path of first magnetic flux within the rotor assembly is only located inside the bearing plate not comprising any permanent magnets.

6. The rotor-bearing assembly according to claim 1, wherein the rotor assembly comprises a blade unit comprising blades to pump the fluid, which is arranged between a bearing plate and a motor plate comprising multiple suitable arranged permanent magnets to couple in a motor force, wherein the bearing plate and the motor plate are planar cylindrical bodies aligned parallel to each other.

7. A fluid pump comprising a housing having an inlet opening for receiving the fluid and an outlet opening for discharging the fluid, an active magnetic rotor-bearing assembly for conveying a fluid comprising a rotor assembly driven by a motor assembly and a bearing assembly for contactless bearing the rotor assembly to pump the fluid from an inlet opening through a rotor assembly to an outlet opening, wherein the bearing assembly comprises an even number of electromagnetic units arranged around a central structure of the bearing assembly, which provides a fluid channel towards the rotor assembly, each comprising a first salient established by a magnetic material and a permanent magnet at least magnetically connected to the magnetic material providing a first magnetic pole facing towards the rotor assembly and a coil wound around the first salient, where the bearing assembly further comprises an inter yoke comprising inter yoke portions connected to the first salient of each electromagnetic unit, where the permanent magnets of adjacent electromagnetic units, where the permanent magnets of the adjacent electromagnetic units are suitably arranged to provide a closed first magnetic flux via the first salient and the yoke portions of the both adjacent electromagnetic units and the rotor assembly applying a first attractive force acting on the rotor-assembly for compensating at least present motor and fluid-caused forces at a levitation position of the rotor assembly further comprising means for a position stabilizing portion perpendicular to the first attractive force on the rotor-assembly, and the coils providing an electromagnetic flux between each first salient and the rotor assembly for applying adaptable axial force and/or tilting torque to the rotor assembly keeping the rotor within a levitation range during rotation and compensating the current motor force and fluid-caused forces during any fluctuation and-any additional forces in order to adjust the bearing provided by the first magnetic flux with rotor the rotor assembly to pump the fluid from the inlet opening through the rotor assembly to the outlet opening and the bearing assembly to enable a contactless rotating the rotor assembly inside the housing, and the motor assembly to drive the rotor assembly, where the rotor assembly has an open central structure connected to the outlet opening for discharging the fluid, wherein adjacent inter-yoke portions are separated from each other by a structure spacer with a magnetic permeability lower than a magnetic permeability of the inter-yoke portions, wherein the structure spacer is a permanent magnet with an orientation adding an extra magnetic flux to the first magnetic flux.

8. The fluid pump according to claim 7, wherein the rotor assembly comprises a blade unit comprising blades to pump the fluid, which is arranged between a bearing plate and a motor plate comprising multiple suitable arranged permanent magnets, to couple in a motor force provided by the motor assembly, wherein the bearing plate and the motor plate are planar cylindrical bodies aligned parallel to each other.

9. The fluid pump according to claim 8, wherein the bearing plate and the motor plate have equal thicknesses parallel to a rotational axis of the rotor assembly.

10. The fluid pump according to claim 8, wherein the blades at least partly extend from the bearing plate to the motor plate with fluid channels between the blades, where the shape of each fluid channel is defined by the adjacent blades, where the shapes of the blades are adapted to reduce a radially directed portion of the fluid caused force to a value smaller than the radial force applicable by the bearing assembly when pumping the fluid.

11. The fluid pump according to claim 8, wherein at least the bearing plate and the blade unit comprise inner holes around the central structure.

12. The fluid pump according to claim 7, wherein the fluid pump further comprises position sensors to detect the position of the rotor assembly and a control unit receiving rotor position data from the position sensors and controlling the bearing assembly in response to the received rotor position data.

13. A method to operate an active magnetic rotor-bearing assembly for conveying a fluid comprising a rotor assembly driven by a motor assembly and a bearing assembly comprising an even number of electromagnetic units arranged around a central structure of the bearing assembly, which provides a fluid channel towards the rotor assembly, each comprising a first salient established by a magnetic material and a permanent magnet at least magnetically connected to the magnetic material providing a first pole facing towards the rotor assembly and a coil wound around the first salient, where the bearing assembly further comprises an inter-yoke comprising inter-yoke portions connected to the first salient of each electromagnetic unit, the method comprising the steps of:

contactless bearing the rotor assembly to pump the fluid from an inlet opening through the rotor assembly to an outlet opening by providing a closed first magnetic flux via the first salient and the inter-yoke portions of the both adjacent electromagnetic units and the rotor assembly applying a first attractive force acting on the rotor-assembly for compensating at least present motor and fluid-caused forces at a levitation position of the rotor assembly further comprising a position stabilizing portion perpendicular to the first attractive force on the rotor-assembly using suitably arranged permanent magnets of the first salient; and balancing the bearing provided by the first magnetic flux by an electromagnetic flux between each first salient and the rotor assembly to apply an adaptable axial force and/or tilting torque to the rotor assembly keeping the rotor within a levitation range during rotation and compensating the current motor force and fluid caused force during any fluctuation and any additional forces, wherein adjacent inter-yoke portions are separated from each other by a structure spacer with a magnetic permeability lower than a magnetic permeability of the inter-yoke portions, wherein the structure spacer is a permanent magnet with an orientation adding an extra magnetic flux to the first magnetic flux.

14. The rotor-bearing assembly according to claim 6, wherein the bearing plate and the motor plate are planar cylindrical bodies having equal thicknesses parallel to a rotational axis of the rotor assembly.

15. The fluid pump according to claim 8, wherein the multiple suitable arranged permanent magnets are arranged in a Halbach array.

* * * * *